TAPE APPARATUS SPEED CONTROL
Filed May 28, 1962
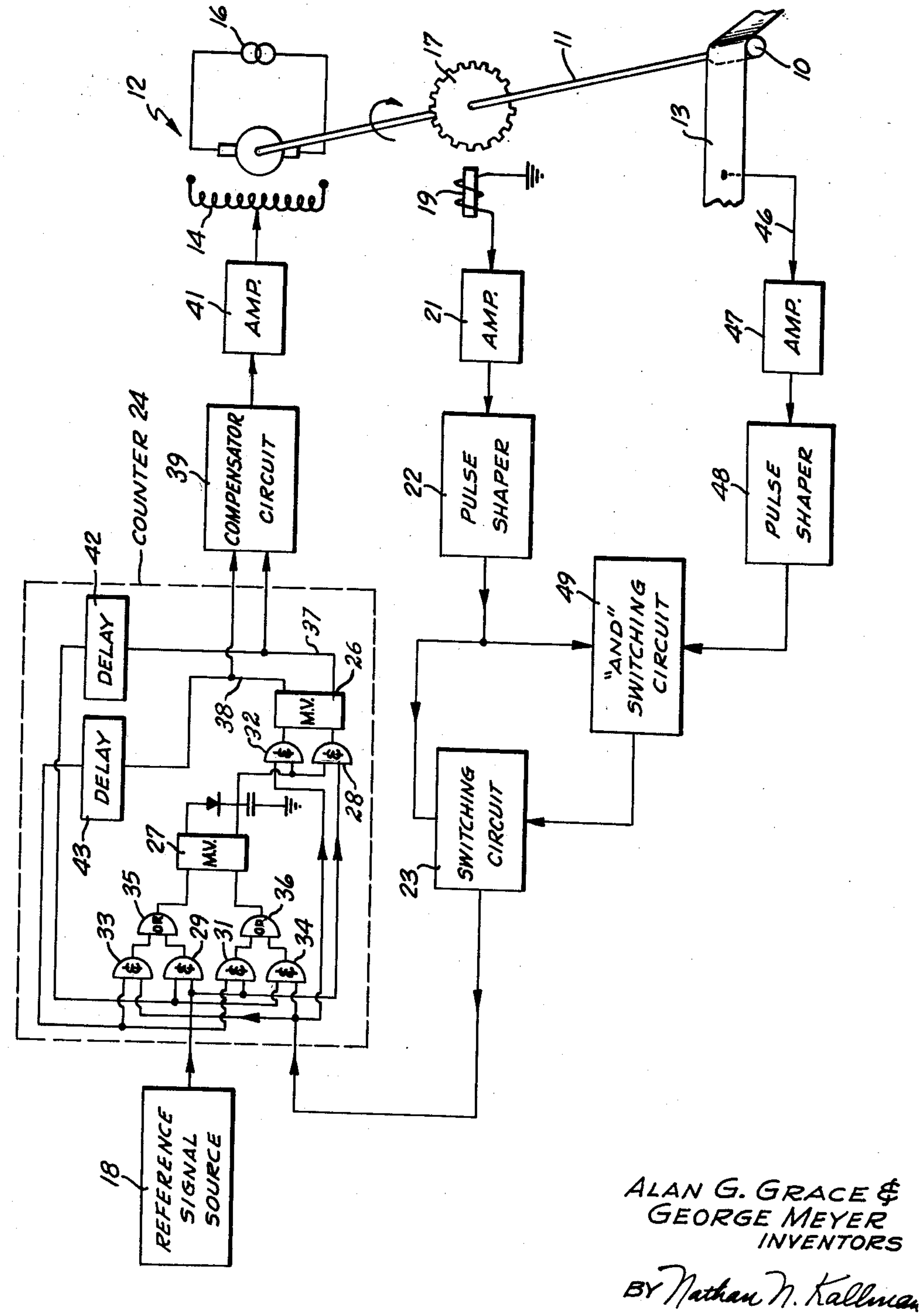
ALAN G. GRACE &
GEORGE MEYER
INVENTORS
BY Nathan N. Kallman
ATTORNEY 3,196,421

TAPE APPARATUS SPEED CONTROL

Alan G. Grace, Menlo Park, and George Meyer, San Francisco, Calif., assignors to Ampex Corporation, Redwood City, Calif., a corporation of California Filed May 28, 1962, Ser. No. 198,290
6 Claims. (Cl. 340—174.1)

This invention relates to servomechanism systems and more particularly, to a servomechanism system capable of accurately controlling the position of a moving medium with respect to a reference.

Various servomechanism systems have been developed in the past for controlling the position of a moving medium such as magnetic tape, roll film, or paper tape with respect to a reference. For example, in a recorder/reproducer system wherein information is recorded on a magnetic tape by magnetic heads that are carried by a rotary drum that rotates in a plane extending transversely of the tape, a certain relationship is maintained between the rotational position or phase of the heads and the longitudinal position of the tape during playback. More particularly, the relationship of the heads (controlled by drum motor rotation) relative to the longitudinal position of the tape (controlled by capstan motor rotation) that existed during recording is recreated and constantly maintained during playback.

To effect the maintenance of this relationship, it is desirable to synchronize the rotation of the capstan motor with that of the head drum motor. To effect this in the previously utilized systems, a control signal that is generated by a suitable pulse producing member mounted on the head drum motor shaft for rotary motion therewith is recorded along the edge of the tape as a control track. The output signal derived from this member during playback is utilized as a reference against which signals derived directly from the control track information are compared. The capstan motor speed is controlled by the results of the comparison between these signals to maintain the exact relationship between the angular position of the heads and the longitudinal position of the tape that existed during the recording process.

Various servo systems have been incorporated in the previously utilized recorder/reproducers to compare the reference signal with the contol track information to thereby maintain the desired position of the tape with respect to the heads. Among other circuitry incorporated in the servo systems, phase comparators and the like have been utilized to accomplish this comparison. These servo systems however, have not provided satisfactory results when the system has been employed for playback over a wide range of speeds. In addition, when attempts are made to modify the previously developed servo systems to function over a wide range of speed, the servo systems become highly susceptible to drift and adversely affected by load variations so that system operation is highly unstable.

Accordingly, it is an object of the present invention to provide an improved servomechanism system for accurately controlling the position of a moving medium with respect to a reference.

A further object of the present invention is to provide a servomechanism system that has the necessary response characteristics to satisfactorily function over a dynamic speed range, while at the same time providing the necessary independence of system operation to load variations.

Another object of the present invention is to provide a servo system capable of controlling the position of the moving medium with respect to a reference, which system is reliable in performance, economical in cost and operation, capable of ready manufacture, light and durable, and easily serviced.

Other objects and advantages of the present invention will become apparent from the following detailed description thereof when considered in conjunction with the accompanying drawing wherein:

FIGURE 1 is a schematic illustration of an embodiment of the servomechanism system showing various features of the present invention.

An embodiment of the system includes means for advancing a medium at a controlled but selectively variable rate. Means are provided in the system for continuously monitoring the rate at which the medium is advanced so that a plurality of output pulses are produced that are a direct function of this advancing rate and yield a direct indication as to the longitudinal position of the tape. A reference pulse source is provided for producing successive output pulses at a periodic rate corresponding to the rate at which the medium should be advanced so that the longitudinal position of the tape with respect to a reference is maintained. A suitable counter means is included in the system for comparing the phases of the output pulse signals from the monitoring means and the reference pulse source so that any variation in such phases results in the production of an output voltage that is proportional thereto. This output voltage from the counter is utilized to adjust the phase or position of the medium so that the longitudinal position of the medium is brought back into proper alignment with the reference.

The system also includes means responsive to the presence of stored information on the moving medium for producing output pulses corresponding thereto when the presence of such information is sensed. Switch means is provided for automatically supplying the output pulses corresponding to the stored information to the counter and for cutting off the output signal from the monitoring means during the periods when stored information has been sensed on the moving medium.

Although the servomechanism system contemplated by the present invention can be utilized to control the position of various types of moving media (e.g. punched paper tape, roll film, etc.) so that the position of the medium with respect to a reference is accurately maintained, the following description will be directed primarily to the servomechanism system as utilized to control the position of a magnetic tape that may have information stored thereon. The description with reference to this particular medium, however, is not intended as a limitation on the scope of the invention.

With reference to the sole figure of the drawing, an embodiment of the invention comprises a capstan 10 that is mounted on a driven shaft 11 and driven at a selected speed by a prime mover generally designated by the numeral 12. The capstan 10 in combination with a pressure roller (not shown) is designed to advance a data storage medium 13, such as a magnetic tape, so that the position of the medium with respect to a reference is maintained as hereinafter described.

The prime mover 12 is preferably a direct current motor designed to have the speed thereof controlled through voltage supplied to field windings 14 so that a selected tape advancing rate can be maintained. To facilitate motor speed control by controlling field current, the armature of the motor 12 is supplied by a constant current source 16. One constant current source that can be satisfactorily utilized to supply the armature of the motor 12 when operated over a wide range of speed is disclosed and claimed in a copending application of the common assignee, Serial No. 190,905 which was filed on April 30, 1962.

The driven shaft 11 that links the prime mover 12 to the driven capstan 10 is provided with a suitable pulse producing means that monitors the rotary motion of the shaft. The illustrated pulse producing means 17 includes a toothed wheel 17 and a suitable transducer 19. The toothed wheel is chosen so that a relatively large number of pulses is produced during each revolution of the shaft 11. The number of pulses produced during each revolution of the shaft is correlated to digital pulse information supplied by a refernce pulse signal source 18 that dictates and controls the desired advancing rate of the medium 13.

When the advancing medium 13 is a magnetic tape having information stored thereon as a result of previous (transverse) recording operation, the reference digital pulse information supplied from the source 18 is preferably the output from a tachometer associated with a head drum (not shown) utilized to effect the earlier recording operation. It should be understood, however, that the source 18 might be any number of other sources that could supply reference information at a rate corresponding to another selected characteristic against which the advancing rate of the medium is to be compared.

The pulses produced by the toothed wheel 17 are monitored and picked up by the transducer 19, which may for example be a magnetic transducer having responsive characteristics that complement the pulse producing characteristics of the member 17. The output signal from the transducer 19, which consists of successive pulses produced at a repetition rate corresponding to the advancing rate of the medium 13, is fed through a conventional amplifier 21 and a conventional pulse shaper 22 to a switching circuit 23, hereinafter described. The output from the switching circuit 23 is fed to a counter circuit generally designated by the numeral 24, which also has the reference digital pulse information supplied directly thereto from the source 18. The counter 24 functions to compare the phase of the pulse signal from the member 17 with the phase of the pulse signal of the reference digital pulse information supplied from the source 18.

The counter 24 includes a pair of conventional bistable multivibrators 26 and 27. The input pulses supplied to the counter 24 from the reference digital pulse source 18 and the switching circuit 23 are simultaneously applied to a plurality of conventional "AND" gates that are incorporated in the input circuits to the multivibrators 26 and 27. More particularly, as shown, the reference digital pulse information supplied from the source 18 is fed to an "AND" gate 28 connected to the input of the multivibrator 26 as well as to a pair of "AND" gates 29 and 31 that supply the input to the multivibrator 27. Similarly, the output from the switching circuit 23 is fed to an "AND" gate 32 in the input circuit of the multivibrator 26 as well as to a pair of "AND" gates 33 and and 34 which are connected to the input circuit of the multivibrator 27. The "AND" gates 29 and 33 and the "AND" gates 31 and 34 are connected respectively through conventional "OR" gates 35 and 36 to the input of the multivibrator 27.

As hereinafter described, the bistable multivibrator 26 as utilized in the illustrated system, is designed to alternately switch between two stable modes of operation. That is, the multivibrator 26 functions as a conventional "flip-flop" circuit, changing from one conductive state to another when pulse information is alternately supplied thereto from the switching circuit 23 and from the reference digital pulse source 18. Accordingly, the output voltage from the multivibrator 26, which is supplied to a pair of output terminals 37 and 38, varies between two distinct voltage levels when the multivibrator 26 alternately shifts between the two stable modes of operation.

The output signal from the terminals 37 and 38 is fed through a conventional compensator circuit 39 that minimizes system "hunting." In this connection, the compensator circuit 39 includes suitable error-rate circuitry to stabilize system operation. As shown, the compensator output voltage is fed to a conventional amplifier 41 which, in turn, supplies control voltage to the field winding 14 of the D.C. motor 12. Suitable variations in the voltage supplied to the field winding 14 effect corresponding variations in the rate at which the tape is advanced by the capstan 10. It will be apparent, therefore, that the output voltage from the counter 24 will directly control the rate at which the medium 13 is advanced and, accordingly, the longitudinal position of the tape with respect to a reference.

The output terminal 37 of the multivibrator 26 not only supplies output voltage to the compensator 39 but also is connected through a conventional delay circuit 42 to the "AND" gates 29 and 34 that supply a portion of the input signal to the multivibrator 27. Similarly, the output terminal 38 is connected through a conventional delay circuit 43 to the "AND" gates 31 and 33 in the input circuit of the multivibrator 27. The multivibrator 27 is electrically connected in the counter circuit so that the output votlage therefrom normally supplies the second input voltage component to the "AND" gates 28 and 32 of the multivibrator 26 to open these gates when input pulses are alternately supplied to the counter from the source 18 and switching circuit 23.

When the rate at which the tape 13 is advanced corresponds to the rate dictated by the reference digital pulse information supplied from the source 18, a state of system synchronization exists. That is, the longitudinal position of the advancing tape 13 corresponds to the rotational position of the heads (not shown) that are utilized to scan the tape during a playback operation. System conditions are initially established so that this state of synchronization results in successive pulses being supplied to the counter circuit 24 from the source 18 and from the switching circuit 23. Accordingly, when a reference pulse is supplied to the input circuit of the counter 24, the simultaneous presence of this pulse and the output voltage from the multivibrator 27 at the "AND" gate 28 results in making the multivibrator 26 conductive. An output voltage corresponding to this conductive state is produced at the output terminal 37.

Assuming that this conductive state represents a "saturated" level of output voltage, the output voltage developed at the terminal 38 when a pulse is supplied to the counter from the switching circuit 23 corresponds to an "off" voltage level. As long as this synchronized condition is maintained the counter circuit output voltage varies between the "off" and "saturated" voltage levels at the repetition rate of the supplied pulses.

As illustrated, the output voltage developed at the output terminal 37 of the multivibrator 26 is fed to the "AND" gates 29 and 34 in the input circuit of the multivibrator 27. Since the application of this output voltage to these "AND" gates is delayed by a conventional delay circuit 42, this output voltage is supplied to the "AND" gates 29 and 34 in timed relation with the next pulse supplied to the counter. When the system is in a synchronized state, this subsequent pulse is supplied from the switching circuit 23 so that the "AND" gate 34 is opened and the multivibrator 27 remains in the normal state of conduction.

Should a situation develop whereby a variation in the longitudinal position of the tape 13 with respect to the reference is effected, the system falls out of synchronization to compensate for this variation. In this connection, should the motor speed be increased to a level whereat two successive pulses are supplied from the switching circuit 23 to the counter circuit 24, the normal operation of the multivibrator 27 is changed so that the multivibrator 27 conducts in an alternate mode. Accordingly, the output voltage therefrom is blocked and the multivibrator 26 no longer shifts between the operational modes as previously described.

If the previous pulse supplied to the counter 24 was a pulse supplied from the switching circuit 23, then the "AND" gates 31 and 33 have delayed voltage pulses supplied thereto from a conventional delay circuit 43 connected to the output terminal 38 of the multivibrator 26, If the next succeeding pulse is also supplied from the switching circuit 23 rather than from the reference pulse source 18, then the "AND" gate 34 is blocked but the "AND" gate 33 is open so that the multivibrator 27 is forced to shift to the alternate conductive mode. As a consequence, no output voltage is supplied to the "AND" gates 28 and 32 from the multivibrator 27, and the output voltage from the counter 24 corresponds to the "off" voltage level. This output voltage is fed to the compensator circuit 39 and the amplifier 41, as previously described, to effect a suitable variation in field current so that the speed of the motor 12 is adjusted (in this case slowed down) and the synchronized condition is once again established.

In order to re-establish the synchronized condition of the system, the counter circuit must be supplied with two successive pulses from the reference source 18. The two successive reference pulses indicate that the correction has been effected, and the operation of the multivibrator 27 reverts to the normal state of conduction.

The maximum possible deviation between the actual longitudinal position of the tape and that dictated by the reference without causing the system to fall out of synchronization is small. In this connection, the longitudinal tape position deviation will be directly proportional to the maximum error in the output shaft angle and this is limited to the spacing between adjacent teeth on the toothed wheel 17.

A "character lock" feature is incorporated in the system and is utilized to derive tape position information from information stored on the tape as a result of an earlier recording operation (i.e. from the control track recorded on the tape). In this connection, an information position sensor generally designated by the numeral 46 is positioned so as to sense the presence of information on the advancing medium. When the presence of such information is sensed, the output signal from the sensor, which is fed through a conventional amplifier 47 and a conventional pulse shaper 48, is supplied to a second switching circuit 49.

As illustrated, the output signal from the pulse shaper 22 that is coupled to the output circuit of the transducer 19 is also fed to the second switching circuit 49. The switching circuit 49 functions to produce output voltage pulses only when pulses are supplied thereto from both the pulse shaper 22 and the pulse shaper 48, and in this sense functions as an "AND" circuit. When this coincidence of pulses occurs, the information from the pulse shaper 48 is fed through the switching circuit 49 and the output pulse information corresponds in time to that derived from the tape. The switching circuit 23, which normally supplies information directly from the pulse shaper 22 to the counter 24, only passes the amplified pulse information fed from the information position sensor 46 when voltage pulses are simultaneously supplied thereto from the pulse shaper 22 and the switching circuit 49. More particularly, the switching circuit 23 functions to block the output information from the shaft angle monitoring transducer 19 and passes the information picked up by the information position sensor 46 each time the presence of stored information is sensed on the tape.

Accordingly, the system selectively shifts from an operational mode wherein the medium position information is derived from a pulse producing means associated with the tape advancing drive mechanism to an operational mode wherein the information is derived from information stored on the advancing medium itself. In this connection, the aforedescribed operation of the counter circuit 24 in either a synchronized or unbalanced state is the same as previously described, whether the information from the switching circuit 23 is derived from the toothed wheel 17 or from the tape itself.

One specific embodiment of the system illustrated in the drawing is utilized to control the speed of a capstan drive motor over a range between 40 r.p.m. and 6000 r.p.m. To accomplish this and yet accurately maintain the position of the tape medium, the reference digital pulse information from the source 18 varies from between 300 pulses/second and 45,000 pulses/second. When operated at any speed over the above range, the capstan drive motor is closely controlled by the system so that the position of a tape medium advanced thereby with respect to a reference is accurately maintained.

The foregoing description is merely illustrative in the application of the invention. Moreover, it should be understood that although one embodiment of the system has been described in conjunction with reference to a magnetic tape, various other media could have the position thereof with respect to a reference accurately controlled by the described system. In this connection, suitable modifications would be made in the nature of the information sensing means and the reference pulse information to complement the distinct characteristics of these other media.

What is claimed is:

1. A servomechanism system for controlling the position of a moving medium capable of having information stored thereon comprising:
   - a capstan for advancing the medium;
   - means for rotating said capstan at a controlled rate;
   - means for monitoring the rate at which said capstan is rotated and for producing a plurality of output pulses corresponding thereto;
   - position control means for producing successive output pulses at a repetition rate corresponding to the rate at which the medium should be advanced;
   - pulse responsive means connected to the output of said monitoring means and said position control means for producing alternate first and second output signals respectively in response to alternately supplied signals from said monitoring means and said position control means, said pulse responsive means being also responsive to two successive pulses from said monitoring means for sustaining said first output signal until two successive pulses are supplied thereto by the position control means and responsive to two successive pulses from said position control means for sustaining said second output signal until two successive pulses are supplied thereto by the monitoring means;
   - means responsive to the output voltage of said pulse responsive means for adjusting the rate of rotation of said capstan so that the pulse phase from said monitoring means corresponds to the phase of the output pulse from said position control means;
   - means responsive to the presence of stored information on the moving medium for producing output pulses corresponding thereto; and
   - switch means connected to the output of said monitoring means and said information sensing means and responsive to the simultaneous production of output pulses therefrom for automatically supplying only the output pulses from said information sensing means to said pulse responsive means.

2. A servomechanism system for controlling the position of a moving medium capable of having information stored thereon comprising:
   - a capstan for advancing the medium at a selectively variable rate;
   - means for rotating said capstan;
   - means for monitoring the rate at which said capstan is rotated for producing a plurality of output pulses corresponding thereto and indicative of the longitudinal position of the medium;
   - position control means for producing successive output pulses at a repetition rate corresponding to the rate at which the medium should be advanced so that the longitudinal position of the medium with respect to a reference is maintained;
   - a pulse counter connected to the output of said monitoring means and said position control means for producing alternate first and second output signals respectively in response to alternately supplied signals from said monitoring means said position control means, said pulse counter being also responsive to two successive pulses from said monitoring means for sustaining said first output signal until two successive pulses are supplied thereto by the position control means and responsive to two successive pulses from the position control means for sustaining the second output signal until two successive pulses are supplied thereto by the monitoring means;

means responsive to the output voltage of said pulse counter;

means for adjusting the rate of rotation of said capstan so that the phase of the pulse from said monitoring means corresponds to the phase of the output pulse from said position control means;

means responsive to the presence of stored information on the moving medium for producing output pulses corresponding thereto; and switch means connected to the output circuit of said monitoring means and said information sensing means and responsive to the simultaneous production of output pulses therefrom for automatically supplying only the output pulses from said information sensing means to said pulse counter.

3. A servomechanism system for controlling the position of a moving medium capable of having information stored thereon comprising:

a capstan for advancing the medium;

means for rotating said capstan at a controlled rate;

means monitoring the rate at which said capstan is rotated for producing a plurality of output pulses corresponding thereto;

a reference digital pulse source for producing successive output pulses at a repetition rate corresponding to the rate at which the medium should be advanced;

a pulse counter connected to the output circuit of said monitoring means and said reference digital pulse source for producing alternate first and second output signals respectively in response to alternately supplied signals from said monitoring means and said reference digital pulse source, said pulse counter also being responsive to two successive pulses from said monitoring means for sustaining said first output signal until two successive pulses are supplied thereto by the pulse source and responsive to two successive pulses from said position control means for sustaining said second output pulse until two successive pulses are supplied thereto by the monitoring means;

means responsive to the output voltage from said pulse counter means for adjusting the rate of rotation of said capstan so that the phase of the pulse from said monitoring means corresponds to the phase of the output pulse from said reference digital pulse source;

means responsive to the presence of stored information on the moving medium for producing output pulses corresponding thereto; and switch means connected to the output circuit of said monitoring means and said information sensing means and responsive to the simultaneous production of output pulses therefrom for automatically supplying only the output pulses from said information sensing means to said pulse counter.

4. A servomechanism system for controlling the position of a magnetic tape having control track information stored thereon comprising:

a capstan for advancing the magnetic tape at any selected speed over a wide range;

means for rotating said capstan at a controlled but selectively variable rate;

means for monitoring the rate at which said capstan is rotated for producing a plurality of output pulses corresponding thereto;

a reference digital pulse source for producing successive output pulses at a repetition rate corresponding to the rate at which the magnetic tape should be advanced;

a pulse counter connected to the output of said monitoring means and said reference digital pulse source for producing alternate first and second output signals respectively in response to alternately supplied signals from said monitoring means and said reference digital pulse source, said pulse counter also being responsive to two successive pulses from said monitoring means for sustaining said first output signal until two successive pulses are supplied thereto by the pulse source and responsive to two successive pulses from said pulse source for sustaining said second output pulse until two successive pulses are supplied thereto by the monitoring means;

means responsive to the output voltage from said pulse counter for adjusting the rate of rotation of said capstan so that the phase of the pulse from said monitoring means corresponds to the phase of the pulse from said reference digital pulse source;

means responsive to the presence of control track information on the magnetic tape for producing output pulses at rate corresponding to the control track information; and switch means connected to the output of said monitoring means and said information sensing means and responsive to the simultaneous production of output pulses therefrom for automatically supplying only the output pulses from said information sensing means to said pulse counter.

5. A servomechanism for controlling the rate of advance of a recording medium comprising a capstan engaging the medium for longitudinally advancing the same, a D.-C. motor connected to said capstan for rotating the same, said motor having a separate field winding and armature winding, a constant current source connected to said armature winding, means responsive to the rate at which the capstan is being rotated for providing a plurality of first pulses at a rate corresponding thereto, reference means for producing a polarity of second pulses at a rate corresponding to the rate at which the medium should be advanced, pulse responsive means responsive to alternately provide first and second pulses for alternately providing first and second output signals, respectively, said pulse responsive means also responsive to two successive first pulses for sustaining said first output signal until two successive second pulses are provided thereto and responsive to two successive second pulses for sustaining said second output signal until two successive first pulses are provided thereto, and means connected to said field winding and responsive to said sustained output signal and to said first and second alternating output signals for controlling the speed of said D.-C. motor and thereby adjusting the rate of advance of the medium until the phase of said first pulses is in a predetermined relation to the phase of said second pulses.

6. A servomechanism for controlling the rate of advance of a recording medium comprising a capstan engaging the medium for longitudinally advancing the same, a prime mover connected to the capstan for rotating the same, a first transducer responsive to the rate at which the capstan is being rotated for providing a plurality of first pulses at a rate corresponding thereto, a second transducer responsive to the rate at which said medium is being advanced for providing a plurality of second pulses at a rate corresponding thereto, reference means for producing a plurality of reference pulses at a rate corresponding to the rate at which the medium should be advancing, switching means responsive to the presence of said second pulses for providing said second pulses when the same are present and said first pulses in the absence of said second pulses, pulse responsive means responsive to pulses provided alternately by said reference means and said switching means for alternately providing first and second output signals, respectively, the duration of said output pulses being related to the phase relationship between the reference pulse and the pulse from said switching means, said pulse responsive means being also responsive to two successive first pulses for sustaining said first output signal until two successive second pulses are provided thereto and responsive to two successive second pulses for sustaining said second output signal until two successive first pulses are provided thereto, said pulse responsive means including a counter having a pair of multivibrators connected in series so as to be capable of counting four in a forward direction in response to reference pulses applied thereto, and four in a backward direction in response to pulses from the switching means, and means responsive to said sustained output signal and to said alternating output signals for controlling the speed of said prime mover and thereby adjusting the rate of advance of the medium until the pulses from said switching means are in a predetermined relation to the pulses from said reference means.

References Cited by the Examiner

UNITED STATES PATENTS

| | | | |
|---|---|---|---|
| 2,854,526 | 9/58 | Morgan | 340—174.1 |
| 2,866,143 | 12/58 | Maxwell | 318—314 |
| 2,876,004 | 3/59 | Sink | 340—174.1 |
| 3,064,173 | 11/62 | Breen | 318—312 |
| 3,071,644 | 1/63 | Olive | 318—314 |

IRVING L. SRAGOW, *Primary Examiner.*